United States Patent [19]

Maar

[11] Patent Number: 5,425,621
[45] Date of Patent: Jun. 20, 1995

[54] DEVICE FOR AXIALLY SECURING MOVING BLADES AND FOR ELIMINATING ROTOR UNBALANCES FOR AXIAL-FLOW COMPRESSORS OR TURBINES

[75] Inventor: Karl Maar, Pfaffenhofen, Germany

[73] Assignee: MTU Motoren- und Turbinen-Union Muenchen GmbH, Munich, Germany

[21] Appl. No.: 182,691

[22] Filed: Jan. 13, 1994

[30] Foreign Application Priority Data

Jan. 14, 1993 [DE] Germany .................. 43 00 773.2

[51] Int. Cl.$^6$ ............................................. F01D 5/26
[52] U.S. Cl. ...................... 416/144; 416/220 R; 416/221
[58] Field of Search ............ 416/219 R, 220 R, 221, 416/248, 500, 144, 145; 411/513, 515, 516, 520

[56] References Cited

U.S. PATENT DOCUMENTS

| | | | |
|---|---|---|---|
| 2,843,356 | 7/1958 | Hull, Jr. | 416/144 |
| 3,076,634 | 2/1963 | Boyle et al. | 416/221 |
| 3,653,781 | 4/1972 | Cooper | 416/221 |
| 4,102,602 | 7/1978 | Rottenkolber | 416/221 |
| 4,477,226 | 10/1984 | Carreno | 416/220 R |
| 4,898,514 | 2/1990 | McCracken | 416/144 |

FOREIGN PATENT DOCUMENTS

| | | |
|---|---|---|
| 0437977 | 7/1991 | European Pat. Off. |
| 1051286 | 2/1959 | Germany |
| 0672401 | 5/1952 | United Kingdom ........ 416/220 R |
| 0691380 | 5/1953 | United Kingdom .......... 416/221 |
| 0793930 | 4/1958 | United Kingdom .......... 416/221 |
| 0819433 | 9/1959 | United Kingdom ........ 416/220 R |
| 2105790 | 3/1983 | United Kingdom .......... 416/144 |

*Primary Examiner*—Edward K. Look
*Assistant Examiner*—Christopher Verdier
*Attorney, Agent, or Firm*—Evenson, McKeown, Edwards & Lenahan

[57] ABSTRACT

A device for axially securing a moving blade and for eliminating rotor unbalances is provided. The moving blade has a blade base. A wheel disk has circumferentially distributed axial grooves. The blade base is anchored in one of the axial grooves wherein the axial groove encloses an indentation formed between a bottom of the axial groove and an end of the blade base. A filler piece operatively arranged on the bottom of the axial groove, and a securing plate having two ends, are insertable into the indentation. The securing plate is arranged to bridge a gap formed between the end of the blade base and the filler piece along an axial length of the indentation with the two ends projecting beyond the indentation. The securing plate is bent at each of its two ends in a mutually opposite manner with respect to end faces of the filler piece, wheel disk and blade base. One rotor unbalance of the blade is compensated by at least one filler piece.

18 Claims, 1 Drawing Sheet

DEVICE FOR AXIALLY SECURING MOVING BLADES AND FOR ELIMINATING ROTOR UNBALANCES FOR AXIAL-FLOW COMPRESSORS OR TURBINES

BACKGROUND OF THE INVENTION

This invention relates to a device for axially securing a moving blade and for eliminating rotor unbalances in the case of axial-flow compressors or turbines of gas turbine engines, in which the moving blades are anchored by means of their blade bases on axial grooves of a wheel disk distributed along the circumference. Each axial groove encloses an indentation formed between the groove bottom and the base end.

A known device of this type is described in European Patent document EP-A 0437 977. The moving blade operates as an axial securing device of an unbalance weight, which only in specific cases can be anchored by means of its exterior edge end on a recess of the blade base. The moving blade is approximately crescent-shaped in its cross-section. In this case, the unbalance weight is situated in an indentation between the base end and the groove bottom closed by the blade base on one side. All moving blades are secured only in one axial direction by a snap ring which circumferentially extends on the outside between the wheel rim and the blade base ends. The snap ring engages in this case on the upper end in grooves of axially projecting projections of the blade bases.

When a local disk unbalance or rotor unbalance is determined, the axial securing must first be released and a concerned moving blade must be pulled out of the axial groove in order to be able to push the weight, together with the blade, into the axial groove. The one-sided axial blade securing and the weight arrangement, which can be secured on the blade, require a relatively expensive and costly fastening of the blade.

A device for axially securing blades known from German Patent document DE-AS 10 51 286 requires a complicated blade construction, particularly with a base-side contact flange by means of which the blade is axially secured in one direction on a side of the wheel rim. For securing in the other axial direction, the prior art provides a strip constructed as a spring steel sheet. Before the installation of the blade, the strip is inserted in an axial flute on the groove bottom. The flute forms a one-sided indentation which is expanded in a diverging manner toward one wheel rim side. In the position of the strip which is pressed down with respect to the indentation, the blade is slid from one side into the axial groove. In a recess area of the contact flange, the strip, which springs upward radially out of the indentation, forms a bent stop which axially secures the blade in the other direction. Another bent stop of the strip secures it on the wheel rim on the side facing away from the indentation. In the prior art, no compensation is provided with respect to unbalances. This also applies to alternatives of the known case, according to which, for example, the flute encloses a uniform indentation along its whole length and the spring strip has a downwardly directed U-shaped right-angle bend.

SUMMARY OF THE INVENTION

There is therefore needed a device according to the initially mentioned type, by means of which, without any special constructive expenditures, two-sided axial blade securing and controlling of rotor unbalances are achieved in a comparatively simple manner, particularly on the blade bases and on the wheel rim.

According to the invention, these needs are met by providing a filler piece, which sits on the groove bottom, and a securing plate, that are inserted in each indentation. The securing plate bridges a gap between the base end and the filler piece extending along the indentation. On the two ends projecting out of the indentation, the securing plate is bent in a mutually opposite manner with respect to the faces of the filler piece, of the wheel disk, and of the blade base. One rotor unbalance is compensated by at least one filler piece.

In an installed condition, all filler pieces together with the respective securing plate completely fill up the corresponding indentations along the entire axial groove length, as well as in the cross-section. In this manner, a good local secondary flow sealing is achieved on the wheel disk or on the wheel rim. In a relatively simple manner, the blades and the filler pieces or balancing masses are simultaneously axially secured on both sides. In a first installation configuration, all indentations, including installed securing plates, can be filled up with filler pieces of a respective identical specific weight. For example, if a local rotor unbalance or residual unbalance occurs on the disk, only a tab or an end piece of the plate has to be bent into a position that is parallel to the axis. This allows a filler piece to be axially pulled out from one side and replaced by a filler piece with an unbalance-specific mass which is congruously contoured on the outside. The invention could therefore also be implemented in such a manner that first the filler pieces with the same specific weight, and then the securing plates, are inserted. Then, the bending of the tabs or end pieces will take place—with the exception of the respective above-mentioned one tab or end piece—which has the purpose of axially securing the plate on one side. In other words, the balancing takes place in a condition in which this one tab is in each case still in the position which is parallel to the axis. After an unbalance is determined, the concerned filler piece can now be replaced directly in the axial direction by another filler piece which, however, has a deviating specific balancing mass, whereupon all tabs which project beyond the disk circumference in parallel to the axis are radially bent.

Furthermore, it is advantageously possible to make available the securing plates before the mounting with tabs or end pieces which are already bent on one side. It is a prerequisite of the above-mentioned measure that the filler pieces and the securing plates are arranged in the indentation—between the base end and the groove bottom—by means of a slightly "tight" fit. Small eyes, bores, indentations or recesses on the filler pieces can facilitate the pulling-out for the purpose of an exchange of weights or for the demounting by means of a tool.

As a result of the illustrated measures, frequent bending and premature material fatigue of the securing plates can also be reduced to a minimum. The use of securing plates and their occasional replacement and of filler pieces which, with respect to weight, are coordinated in an unbalance-specific manner, is clearly less cost-intensive than highly complicated measures which, as a rule, axially secure the blades only on one side and which use noses or projections on blades and on the wheel rim with holding and sealing plates which are inserted between them along the circumference and which, in addition, require high mounting expenditures. In the state of the art, unbalance problems cannot be solved by means of the latter measures in a manner that is advantageous with respect to the mounting.

Because of the fact that filler pieces can be used in the present invention which are softly rounded on the corners or are approximately semicircular in their cross-section, and which are coordinated precisely with the concerned counterfaces of the indentations, a locally large surface loading on the wheel rim can be achieved which is distributed essentially uniformly.

Other objects, advantages and novel features of the present invention will become apparent from the following detailed description of the invention when considered in conjunction with the accompanying drawings.

DESCRIPTION OF THE PREFERRED EMBODIMENT

Figure 1:
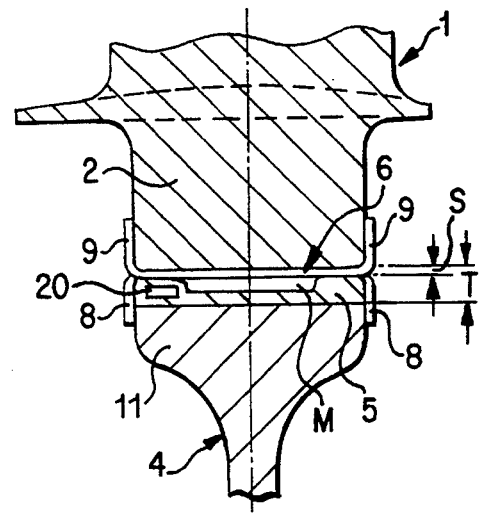
FIG. 1 is a longitudinal sectional view of an installed and completely mounted device according to the present invention in an assignment to sections, which are broken off toward the top and toward the bottom, of a moving blade and of a wheel disk, with a wheel rim.

FIGS. 1 to 6 illustrate the device for axially securing moving blades and for eliminating rotor unbalances in the case of an axial flow compressor or a turbine of a gas turbine engine. In this case, the moving blades 1 are anchored by means of their blade bases 2 on axial grooves 3 of a wheel disk 4. The grooves 3 are uniformly distributed along the circumference of the wheel disk 4. Each axial groove 3 contains an indentation T which is formed between the groove bottom and the blade base end. A filler piece 5, which sits on the groove bottom, and a securing plate 6 or 12, are to be inserted in each indentation T. The securing plate 6 or 12 bridges a gap S formed between the base end and the filler piece 5 which extends along the length of the indentation T. In the completely installed condition, the securing plate 6 or 12 is bent on its two ends, which two ends project out of the indentation T, the wheel disk or wheel rim 11, and the blade base 2 in a mutually opposite direction with respect to the faces of the filler piece 5. A determined rotor unbalance can be compensated with respect to weight by means of at least one filler piece 5 of this type.

Figure 2:
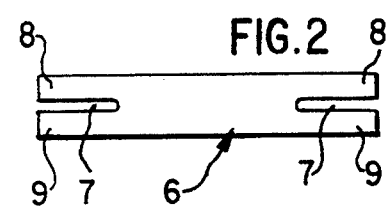
FIG. 2 is a top view of the securing plate of FIG. 1 in a completely extended state.
Figure 5:
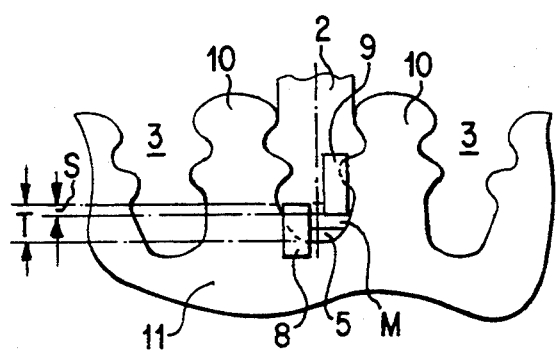
FIG. 5 is a frontal view of a cutout of the wheel rim, illustrating the completely mounted device according to FIGS. 1 and 2.

In a first embodiment of the invention, and applied to FIGS. 1, 2 and 5, the securing plate 6 has two tabs 8, 9 on its two ends which are each separated from one another by a longitudinal slot 7. One tab 9 is bent with respect to the faces of the blade bases 2 and of a disk hump 10. The other tab 8 is bent with respect to the faces of the wheel rim 11 and of the filler piece 5.

Figure 3:
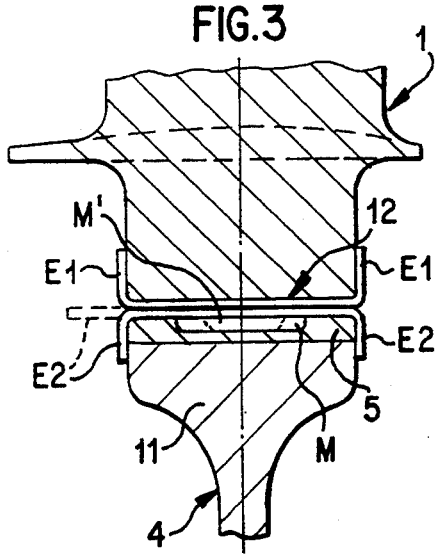
FIG. 3 is a longitudinal sectional view of an installed and completely mounted device according to the present invention in an assignment to sections, which are broken off toward the top and toward the bottom, of a moving blade and of a wheel disk with a wheel rim, illustrating a securing plate which consists of two plate strips and which is modified with respect to FIG. 1.
Figure 4:
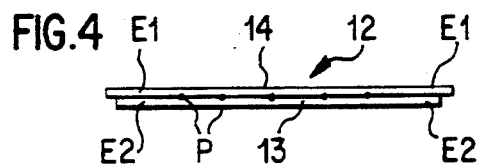
FIG. 4 is a lateral view of the securing plate of FIG. 3 in a completely extended state.
Figure 6:
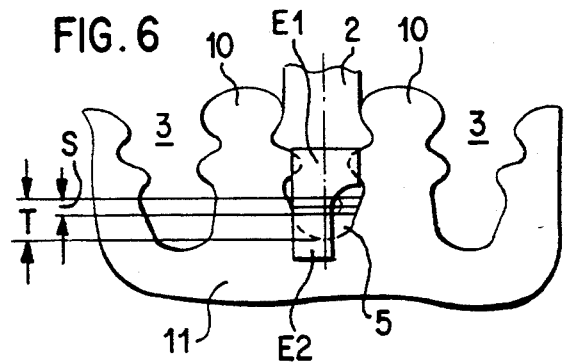
FIG. 6 is a frontal view of a cutout of the wheel rim, illustrating the device according to FIGS. 3 and 4.

In FIGS. 3, 4 and 6, the securing plate 12 consists of two plate strips 13, 14 which are soldered together while leaving unconnected the end pieces E1, E2. Alternatively, they may be welded together with one another, for example, at points P (FIG. 4). Here, one end piece E1 is, in each case, bent with respect to a blade base 2 and the faces of two adjacent disk humps 10. The other end piece E2 is in each case bent with respect to the filler piece 5 and one face on the wheel rim 11.

As illustrated particularly in FIG. 5 or 6, the bent tabs 8, 9 or end pieces E1, E2 of the securing plate 6 or 12, additionally form an edge side sealing of the axial groove 3 and of the indentation T containing the filler piece 5. Tabs 8, 9 or end pieces E1, E2 which are prefabricated to be longer and wider may further promote these advantages.

The filler pieces 5, which are always designed to have a uniform contour, may, for example by means of material recesses M or M' (FIG. 1) of different sizes, form locally adapted balancing masses or balancing elements. In this case, the filler pieces 5 may all be manufactured from a material with a lower specific weight than the material of the wheel disk 4.

In order to compensate for an existing rotor or disk unbalance on the outer circumference of the wheel rim 11 of the wheel 4, the concerned filler piece, which can be selected as the balancing element, may be equipped with an unbalance-specific material filling 20. This may be a filling of lead shot or the like. The filling may be entered into a recess or blind hole bore of the respective filler piece which can be closed off from the outside. The required balancing element may be made available according to the size of the bore and thus the amount of the filler.

It is also possible, for example, to construct the filler pieces 5 from a stainless steel or from a technical ceramic material or from a plastic material reinforced by fibers. In the case of metallic materials, suitable stamping processes may be used, during which the required sizes and types of the recesses or of the beads or nubs in the recesses can be prefabricated at the same time. In each case, this results in unbalance-specific adaptations.

For implementing the invention, it is advantageous for suitable depositing devices to be made available for the filler pieces 5. Weight classifications are assigned to the depositing devices so that the required filler piece can be picked out rapidly as the balancing element.

As illustrated in FIGS. 2, 3, 5 and 6, the filler pieces 5 are constructed to be adapted to the length and shape of the indentation T—between the securing plate 6 or 12 and the groove bottom. In this case, the filler pieces 5, at least partially along their longitudinal course, by means of a cross-section which is softly rounded on the corners or is approximately semicircular, are laterally and on the bottom held in the indentation T (FIG. 6).

As also illustrated in FIG. 6, securing plate 12 consists of two plate strips 13, 14 of different widths. In this manner, the securing plate 12 is adapted to the diagonal contour courses of the indentation T or the axial groove 3 and, when the fit is good, the sealing is thereby optimized.

According to FIGS. 3 and 4, the securing plate 12 is composed of two plate strips 13, 14 of different lengths with respect to the end pieces E1, E2 to be bent.

Among other things, a simplified mounting is achieved by the fact that the respective securing plate 6 or 12 can be used with tabs 7, 8 or end pieces E1, E2 which are already bent in opposite directions to one another on one end.

In the case of the present invention, it is not necessary for the removal or installation of a filler piece 5 to displace the respective moving blade 1 relative to the axial groove 3 or even to have to remove the blade 1 from the axial groove 8. Analogously, this also applies to the removal or installation of the securing plate 6 or 12.

The mounting takes place such that all successively moving blades 1, then all filler pieces 5—with an, at first, respective identical own weight—and then all securing plates 6 or 12 are inserted. Finally, the blades as well as the filler pieces are bent on both sides in an axially securing manner. According to FIG. 3, one end piece E2 may be left to be axially free-standing. When a rotor unbalance occurs, a "light" filler piece contained in the respective indentation T is replaced directly, and by itself by a heavier filler piece 5, and only then are all end pieces E2 bent radially.

By way of the axial grooves 3, the inserted moving blades 1 are anchored radially as well as in the circumferential direction. The geometry of the blade bases 2 and the respectively coordinated axial grooves 3—as illustrated—may be in the shape of a Christmas tree base or of a dovetail or of a hammer head.

Figure 4A:
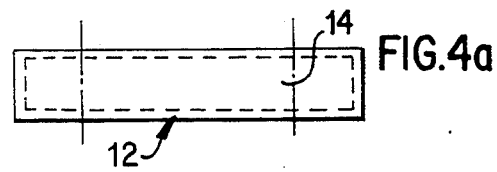
FIG. 4a is a top view of the securing plate according to FIG. 4.

The securing plate 12 (FIG. 4, 4a) may also be used by means of plate strips 13, 14 which are not completely connected with one another and have, for example, the same length and the same width.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Device for axially securing a moving blade and for eliminating rotor unbalances said moving blade having a blade base, comprising:
    a wheel disk having circumferentially distributed axial grooves, said blade base being radially and circumferentially anchored in one of said axial grooves wherein said axial groove encloses an indentation having a shape formed between a bottom of said axial groove and a radially anchored end of said blade base;
    a filler piece operatively arranged on the bottom of the axial groove, and a securing plate having two ends, are insertable into said indentation, wherein said securing plate is arranged to bridge a gap formed between said radially anchored end of the blade base and said filler piece along an axial length of the indentation with said two ends projecting beyond the indentation;
    wherein said securing plate is bent at each of its two ends in a mutually opposite manner with respect to end faces of said filler piece, said wheel disk and said blade base, wherein said filler piece is selectable as a balancing weight to compensate for a rotor unbalance at said wheel disk;
    wherein said blade base, said axial groove and said filler piece all have identical lengths; and
    wherein said balancing weight is contoured to said shape of the indentation in order to fill said gap.

2. A device according to claim 1, wherein said securing plate, on each of its two ends, has two tabs which are separated from one another by a longitudinal slot, of which one tab is bent with respect to the end face of the blade base and of a disk hump, and the other tab is bent with respect to the end face of the wheel rim disk and the filler piece.

3. A device according to claim 1, wherein said securing plate is made of two plate strips having end pieces, of which on each side of said one axial groove, one end piece is bent with respect to the end face of the blade base and two disk humps, and the other end piece is bent with respect to end faces of the filler piece and the wheel disk.

4. A device according to claim 2, wherein the bent tabs of the securing plate form an edge-side sealing of the axial groove and of the indentation containing the filler piece.

5. A device according to claim 3, wherein the end pieces of the securing plate form an edge-side sealing of the axial groove and of the indentation containing the filler piece.

6. A device according to claim 1, wherein the filler piece, which is shaped with a uniform contour, forms via material recesses of different sizes, locally specifically adapted balancing mass.

7. A device according to claim 6, wherein the filler piece is made of a material of a lower specific weight than the material of the wheel disk.

8. A device according to claim 1, wherein the filler piece is equipped with unbalance-specific material fillings.

9. A device according to claim 2, wherein the filler piece is equipped with unbalance-specific material fillings.

10. A device according to claim 3, wherein the filler piece is equipped with unbalance-specific material fillings.

11. A device according to claim 1, wherein the filler piece is constructed to be coordinated with the length and the shape of the indentation between the securing plate and the groove bottom.

12. A device according to claim 11, wherein the filler piece, at least partially along its longitudinal course, is held laterally and on the bottom in the indentation via a cross-section which is rounded on the corners or is approximately semicircular.

13. A device according to claim 3, wherein the two plate strips have different widths.

14. A device according to claim 3, wherein the two plate strips have different lengths with respect to the end pieces.

15. A device according to claim 13, wherein the two plate strips have different lengths with respect to the end pieces.

16. A device according to claim 1, wherein the securing plate is used such that on one end the are bent in opposite directions to one another.

17. A device according to claim 1, wherein the securing plate is made of two plate strips which are soldered or welded together with one another while leaving unconnected end pieces.

18. A device according to claim 3, wherein the two plate strips are soldered or welded together with one another while leaving unconnected end pieces.

* * * * *